(12) United States Patent
Zhu et al.

(10) Patent No.: US 11,970,415 B2
(45) Date of Patent: Apr. 30, 2024

(54) SLUDGE ANAEROBIC FERMENTATION TREATMENT METHOD WITH SIMULTANEOUSLY ENHANCED ACID PRODUCTION AND PHOSPHORUS REMOVAL

(71) Applicant: ZHEJIANG UNIVERSITY, Hangzhou (CN)

(72) Inventors: Liang Zhu, Hangzhou (CN); Donghui Lu, Hangzhou (CN); Jianxun Chen, Hangzhou (CN); Chen Wang, Hangzhou (CN); Taixing Han, Hangzhou (CN); Xiangyang Xu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 660 days.

(21) Appl. No.: 17/149,756

(22) Filed: Jan. 15, 2021

(65) Prior Publication Data

US 2021/0179470 A1    Jun. 17, 2021

Related U.S. Application Data

(63) Continuation of application No. PCT/CN2020/084554, filed on Apr. 13, 2020.

(30) Foreign Application Priority Data

Apr. 16, 2019   (CN) .......................... 201910303827.2

(51) Int. Cl.
  *C02F 11/04*    (2006.01)
  *C02F 1/66*     (2023.01)
  *C02F 101/10*   (2006.01)

(52) U.S. Cl.
  CPC ................ *C02F 11/04* (2013.01); *C02F 1/66* (2013.01); *C02F 2101/105* (2013.01); *C02F 2209/06* (2013.01); *C02F 2303/18* (2013.01)

(58) Field of Classification Search
  CPC ...... C02F 11/04; C02F 1/66; C02F 2101/105; C02F 2209/06; C02F 2303/18; C02F 11/00; C02F 11/15
  See application file for complete search history.

(56) References Cited

FOREIGN PATENT DOCUMENTS

| CN | 101973683 A | 2/2011 |
|----|-------------|--------|
| CN | 102786196 A | 11/2012 |

(Continued)

OTHER PUBLICATIONS

English language machine translation of CN102786196, 13 pages, No Date.*

(Continued)

*Primary Examiner* — Pranav N Patel
(74) *Attorney, Agent, or Firm* — W&G Law Group

(57) ABSTRACT

The present invention discloses a sludge anaerobic fermentation treatment method with simultaneously enhanced acid production and phosphorus removal. The method includes steps of: (1) adding waste activated sludge into an anaerobic reaction system, with a concentration of a total suspended solid (TSS) of 10000-15000 mg/L; (2) maintaining a pH value of the waste activated sludge at 10±0.1; adding powdery magnetite of 0.3-0.9 g/gVS S. Compared with simple alkaline conditions, in the method of the present invention, an accumulation amount of short chain fatty acids (SCFAs) in a fermentation broth is increased by 20%, and a content of orthophosphoric acid is reduced by 10%. The method can further improve the enhancing effect by using sulfuric acid to modify the magnetite, the accumulation amount of SCFAs can be increased by 36.7% at most, and (Continued)

the content of phosphorus and refractory organic substances can be reduced by 32.4% and 40.4% at most, respectively.

17 Claims, 8 Drawing Sheets

(56) References Cited

FOREIGN PATENT DOCUMENTS

| | | | |
|---|---|---|---|
| CN | 103663867 | * | 1/2015 |
| CN | 106517716 A | | 3/2017 |
| CN | 106882871 A | | 6/2017 |
| CN | 107129123 A | | 9/2017 |
| CN | 110066082 A | | 7/2019 |
| CN | 110691758 A | | 1/2020 |
| JP | 2018196885 A | | 12/2018 |

OTHER PUBLICATIONS

English language machine translation of CN103663867, 12 Pages, No Date.*
Panasiuk, Oleksandr. (2010). Phosphorus Removal and Recovery from Wastewater using Magnetite, 45 pages. (Year: 2010).*
International Search Report (PCT/CN2020/084554); dated Jun. 30, 2020.
Effect of pH and phosphorus concentration on phosphorus removal by dissimilatory Fe (III) reduction in activated sludge "Wang Ya'e et al." [Aug. 5, 2015] pp. 4002-4007 preface and sections 1.1,2,3.

* cited by examiner (a)

(b)

SLUDGE ANAEROBIC FERMENTATION TREATMENT METHOD WITH SIMULTANEOUSLY ENHANCED ACID PRODUCTION AND PHOSPHORUS REMOVAL

CROSS-REFERENCE TO RELATED APPLICATIONS

The present application is a continuation of International Patent Application No. PCT/CN2020/084554, filed on Apr. 13, 2020, which claims priority to Chinese patent application NO. 201910303827.2, filed on Apr. 16, 2019, the entire contents of which are incorporated herein by their references.

TECHNICAL FIELD

The present invention relates to a method for anaerobic treatment of waste activated sludge, which is suitable for sewage treatment plants with a low sewage carbon-nitrogen ratio and difficult treatment of waste activated sludge, and belongs to the field of sludge and sewage treatment.

BACKGROUND

With the continuous increase of sewage treatment capacity, the output of waste activated sludge from urban sewage treatment plants in China is also increasing day by day. At the same time, the waste activated sludge is rich in organic matters, which can be converted into short-chain fatty acids by anaerobic fermentation. Studies have shown that short-chain fatty acids are high-quality carbon sources in biological nitrogen and phosphorus removal in wastewater treatment. Therefore, the anaerobic fermentation technology of waste activated sludge has drawn extensive attention.

At present, the main way to obtain a carbon source from sludge is anaerobic fermentation to produce short-chain fatty acids. Among the existing sludge anaerobic fermentation technologies, the alkaline fermentation technology is the most studied because of its high efficiency and low price. This technology uses sodium hydroxide to enhance the short-chain fatty acid production from waste activated sludge fermentation. However, there are three disadvantages in this technology: 1) low microbial activity under alkaline conditions leads to a low acidification rate of organic matters; 2) the alkaline fermentation process produces a large number of refractory organic compounds represented by humic acid; 3) a large amount of phosphorus will be released during fermentation. Studies have shown that the optimal carbon source for biological nitrogen and phosphorus removal from sewage is short-chain fatty acids, so improving the acidification rate of waste activated sludge fermentation broth is the key to improve its carbon source quality. At the same time, if the sludge fermentation broth is directly returned to the mainstream biological treatment system, humic acid and other refractory organic matters and phosphorus elements in the fermentation broth will adversely affect the COD and total phosphorus concentration of the effluent.

Therefore, it is necessary to put forward a technology to improve the conversion rate of organic matters in alkaline fermentation, especially with both phosphorus removal of fermentation products and the consideration about how to reduce the concentration of adverse by-products in the fermentation process.

SUMMARY

The object of the present invention is to provide a method for improving the conversion efficiency of organic substances in anaerobic fermentation under alkaline conditions while reducing the release amount of phosphorus elements, aiming at the problems of low conversion efficiency of organic substances into short-chain fatty acids and large release amount of phosphorus when the waste activated sludge anaerobic fermentation produces acids under the alkalinity provided by sodium hydroxide.

As the first aspect of the present invention, in order to solve the above technical problems, the following sludge anaerobic fermentation treatment method with simultaneously enhanced acid production and phosphorus removal is proposed. Different from the previous simple use of sodium hydroxide to control the pH value of waste activated sludge to promote acid production, in this method, after the pH value is controlled by sodium hydroxide, magnetite is continued to be added to enhance biological action to improve the conversion efficiency of organic substances into short-chain fatty acids, thereby improving the acid production efficiency.

The first aspect of the invention specifically adopts the following technical solution:

A sludge anaerobic fermentation treatment method with simultaneously enhanced acid production and phosphorus removal, comprising the following steps:

(1) adding waste activated sludge into an anaerobic reaction system, wherein a concentration of a total suspended solid TSS of the waste activated sludge is 10000-15000 mg/L, and a concentration of a volatile suspended solid VSS of the waste activated sludge is 6000-9000 mg/L; and (2) adjusting a pH value of the waste activated sludge to 10±0.1 with a sodium hydroxide solution; adding magnetite into the waste activated sludge with an addition amount of 0.3-0.9 g/gVSS; removing air in a reactor, then sealing the reactor, and performing anaerobic fermentation for 10-15 days under stirring, while always maintaining the pH value of the waste activated sludge at 10±0.1 during the stirring and the fermentation.

Preferably, the waste activated sludge is waste activated sludge in an $A^2O$ process.

Preferably, a molar concentration of the sodium hydroxide solution is 2 mol/L.

Preferably, a method for removing air in the reactor comprises introducing nitrogen into the waste activated sludge in the reactor for 5-15 minutes.

Preferably, a rotating speed of the stirring and the fermentation is 60-120 r/min, and a fermentation temperature is 30-35° C.

Preferably, a pH electrode is arranged in the reactor for monitoring the pH value of the waste activated sludge in real time.

The principle of the technical solution in the first aspect of the present invention is as follows: under alkaline conditions, hydroxide ions can destroy the structure of microbial extracellular polymers and promote the dissolution of proteins and polysaccharides in the extracellular polymers of the waste activated sludge; at the same time, alkalinity can destroy the structure of microbial cell walls and release intracellular substances. At the same time, magnetite can effectively enrich acid-producing bacteria, such as dissimilated iron-reducing bacteria, and effectively promote the conversion of polysaccharides, proteins and other organic substances into short-chain fatty acids, which, when combined with alkali, can inhibit methane production, thus leading to the accumulation of short-chain fatty acids. In addition, magnetite can produce ferrous ions ($Fe^{2+}$) by dissimilatory iron reduction, which can be combined with orthophosphate ($PO_4^{3-}$) to form precipitates under alkaline conditions. Meanwhile, magnetite or the generated precipitates can also adsorb part of orthophosphate ($PO_4^{3-}$), thus reducing the phosphorus content in fermentation broth.

The technical solution of the first aspect has the following beneficial effects:

1) Compared with simple alkaline conditions, the accumulation amount of short-chain fatty acids is increased by 20% or more, which effectively promotes short-chain fatty acids production of the anaerobic fermentation of waste activated sludge.

2) Compared with the pure alkaline condition, the content of orthophosphate in waste activated sludge fermentation broth is reduced by 10% or more, which reduces the influence of the fermentation broth as a carbon source on biological phosphorus removal.

Another object of the present invention is to solve the problem that the release amount of refractory organic by-products is large when the waste activated sludge is anaerobically fermented to produce short-chain fatty acids under the alkalinity provided by sodium hydroxide, and at the same time, the performance of improving accumulation amount of short chain fatty acids, phosphorus removal and the like shown in the first aspect of the present invention still needs to be further improved, so a method for effectively reducing the content of refractory organic by-products and phosphorus in the fermentation broth while improving the conversion efficiency of organic matters in anaerobic fermentation of waste activated sludge under alkaline conditions is proposed.

As the second aspect of the present invention, in order to solve the above technical problems, the following method is proposed to enhance the short-chain fatty acids production performance of sludge fermentation and reduce the concentration of its adverse by-products. On the basis of the solution proposed in the first aspect, the method further improves its enhancement effect by using sulfuric acid to modify the magnetic powder, and at the same time, sulfuric acid modification can enable the magnetic powder to remove refractory organic by-products and phosphorus elements in the fermentation broth through adsorption and chemical precipitation, thus achieving the purposes of improving the overall acidification rate of the fermentation broth and slowing down the effect of by-products.

The technical solution specifically adopted in the second aspect of the present invention can further select one or more of the following improvements on the basis of any solution of the first aspect.

Preferably, on the basis of any solution of the first aspect, the magnetite is subjected to acid treatment prior to being mixed with the sludge, and the method for the acid treatment comprises:

placing and continuously stirring powdery magnetite in a reaction kettle while continuously adding a sulfuric acid solution of 93%-98% into the reaction kettle by atomization to form a porous structure on the surface of magnetite powders through reaction of the atomized sulfuric acid with a magnetite powder, wherein a mass ratio of the sulfuric acid solution to the magnetite added in the reaction kettle is 6-24:100.

Furthermore, the powdery magnetite contains not less than 75% of $Fe_3O_4$ with a particle size of 300-400 meshes.

Furthermore, the waste activated sludge is subjected to static concentration treatment prior to being added into the anaerobic reaction system. Still furthermore, in the waste activated sludge after the static concentration treatment, the concentration of the total suspended solid TSS is 25000-30000 mg/L, and the concentration of the volatile suspended solid VSS is 11000-18000 mg/L.

Furthermore, in the reaction kettle, the sulfuric acid solution is added at a speed of 4-6 L/100 kg magnetite powder per hour, and a time for continuous stirring reaction of the magnetite in the reaction kettle is 3-5 h.

The principle of the technical solution in the second aspect of the present invention is as follows: under alkaline conditions, hydroxide ions can destroy the structure of microbial extracellular polymers and promote the dissolution of proteins and polysaccharides in the extracellular polymers of waste activated sludge; at the same time, alkaline conditions can destroy the cell wall structure of microorganisms and release intracellular substances. In addition, magnetic powders can effectively enrich acid-producing functional bacteria, such as dissimilated iron-reducing bacteria, promote the conversion of organic substances such as polysaccharides and proteins into short-chain fatty acids, inhibit the methane-producing reaction in combination with alkaline conditions, and realize the accumulation of short-chain fatty acids. Because the complete structure of the surface of the modified magnetic powders is destroyed (FIG. 5), it is easier to interact with organisms, so it can achieve better enhancement effect; at the same time, the porous structure of the magnetic powders itself and the adsorption of $Fe(OH)_3$ and other substances formed under alkaline conditions can also realize the adsorption of refractory organic byproducts (mainly humic acid) in the fermentation broth, thus reducing the content of refractory organic substances in the fermentation broth; moreover, a small amount of ferric sulfate and ferrous sulfate will be generated after acid modification of magnetic powders, and iron hydroxide substances generated under alkaline conditions will adhere to the surface of magnetic powders, which will adsorb and chemically precipitate with phosphorus. Finally, the magnetic powder with a large amount of phosphorus adsorbed or precipitated on the surface will be separated from the sludge by a magnetic field, thus achieving the purpose of simultaneously enhancing acid production and removing adverse by-products.

Different modification ratios of sulfuric acid can determine the degree of surface reaction of magnetite, and then affect the roughness of the magnetite surface and the content of metal salt in magnetic powders. The higher roughness of the magnetite is more conducive to the electron transfer between microorganisms and magnetic powders and the adsorption of by-products by magnetic powders, and a metal salt is also an important factor in the removal of orthophosphate. On the other hand, excessive metal salts can also adsorb short-chain fatty acids, which will lead to a decrease in acid accumulation. Meanwhile, because metal salts cannot be separated from sludge by a magnetic field, it will lead to an increase in sludge yield. Therefore, different sulfuric acid modification ratios have an important impact on the actual effect and need to be adjusted according to the actual situations.

In the second aspect of the present invention, an optimal solution can be provided, which provides a sludge anaerobic fermentation treatment method with simultaneously enhanced acid production and phosphorus removal and a reduced concentration of adverse by-products, comprising the following steps:

(1) allowing waste activated sludge to stand for 24-36 h to stabilize and concentrate the sludge, wherein the concentrated waste activated sludge has a concentration of a total suspended solid TSS of 10000-30000 mg/L and a concentration of a volatile suspended solid VSS of 4000-18000 mg/L; adding the concentrated waste activated sludge into an anaerobic reactor; and (2) adjusting a pH value of the concentrated waste activated sludge to 10±0.1 with a sodium hydroxide solution, and then adding a modified magnetic powder into the waste activated sludge in the anaerobic reactor, wherein an addition amount of the modified magnetic powder is 0.2-0.6 g/gVSS; introducing nitrogen into the reactor for 5-15 minutes to remove air in the reactor, sealing the reactor, and performing fermentation under stirring at a rotating speed of 60-120 r/min at a fermentation temperature of 30-35° C. for a stirring time of 10-15 days, while always maintaining the pH value of sludge at 10±0.1 during the stirring and the fermentation; and after the reaction is finished, separating the modified magnetic powder from the sludge by using a magnet, wherein the modified magnetic powder is prepared by a method comprising: placing and continuously stirring powdery magnetite in a reaction kettle while continuously adding a sulfuric acid solution of 93%-98% into the reaction kettle by atomization to form a porous structure on a surface of magnetite powder through reaction of the atomized sulfuric acid with magnetite powder, thus obtaining a modified magnetic powder, wherein the sulfuric acid solution is added into the reaction kettle at a speed of 5 L/100 kg magnetite powder per hour, a mass ratio of the sulfuric acid solution to the magnetite added in the reaction kettle is 6-24:100, and a total time of stirring and reaction of the sulfuric acid and the magnetite is 5h.

In the above optimal solution, in the step (2), the addition amount of the modified magnetic powders is 0.2 g/gVSS, 0.4 g/gVSS, or 0.6 g/gVSS.

In the above optimal solution, during preparation of the modified magnetic powder, the mass ratio of the sulfuric acid solution to the magnetite added in the reaction kettle is 6:100, 12:100, or 24:100.

In the above optimal solution, the method further includes increasing the addition amount of the modified magnetic powder and/or increasing the mass ratio of the sulfuric acid solution to the magnetite during the preparation of the modified magnetic powder, in case where removal efficiency of phosphorus and humic acid from sludge anaerobic fermentation products needs to be improved.

In the above optimal solution, the method further includes: reducing the addition amount of the modified magnetic powder and/or reducing the mass ratio of the sulfuric acid solution to the magnetite during the preparation of the modified magnetic powder, in case where a sludge amount reduction effect in the sludge anaerobic fermentation needs to be guaranteed first.

In the above optimal solution, in the step (2), the addition amount of the modified magnetic powder is 0.4 g/gVSS; and during the preparation of the modified magnetic powder, the mass ratio of the sulfuric acid solution to the magnetite added in the reaction kettle is 12:100. When this parameter is adopted, the acid yield, phosphorus removal effect, refractory organic matter removal effect and sludge reduction effect can be integrated, so that the four can be balanced.

In the above optimal solution, in the step (2), the addition amount of the modified magnetic powder is 0.6 g/gVSS; and during the preparation of the modified magnetic powder, the mass ratio of the sulfuric acid solution to the magnetite added in the reaction kettle is 24:100. When this parameter is adopted, the effect of removing phosphorus and refractory organic matter can be maximized, but its sludge reduction effect will be affected, so it is suitable for scenes with high requirements for removing phosphorus from sludge or refractory organic substances.

The technical solution of the above second aspect has the following beneficial effects:

1) Compared with the simple alkaline treatment method, the modified magnetic powders can increase the accumulation of short-chain fatty acids in the fermentation broth by 36.7%, which effectively promotes the anaerobic fermentation of sludge to produce short-chain fatty acids.

2) Compared with the simple alkaline treatment method, the modified magnetic powders can reduce the concentration of humic acid in fermentation liquor by 40.4% at most, and greatly reduce the influence of the fermentation broth as a carbon source on COD in the effluent of biochemical units.

3) Compared with the simple alkaline treatment method, the modified magnetic powder can reduce the concentration of orthophosphoric acid in fermentation broth by 32.4% at most, and effectively reduce the phosphorus content in the sludge anaerobic fermentation broth.

4) On the basis of ensuring an improvement rate of 31.3% of short-chain fatty acid accumulation, a humic acid removal rate of 19.8% and an orthophosphate removal rate of 20%, the sludge reduction rate of the method of the present invention (the addition amount of the modified magnetic powder is 0.4 g/gVSS, and the mass ratio of the magnetic powders to sulfuric acid is 100:12) is only 2.5% lower than that of simple alkaline fermentation sludge reduction effect, and has little influence on the reduction effect of waste activated sludge.

BRIEF DESCRIPTION OF DRAWINGS

FIG. 6(a) illustrates a group of adding unmodified magnetic powder; FIG. 6(b) illustrates a group of adding modified magnetic powder with a mass ratio of magnetic powder to sulfuric acid of 100:6; FIG. 6(c) illustrates a group of adding modified magnetic powder with a mass ratio of magnetic powders to sulfuric acid of 100:12; and FIG. 6(d) illustrates a group of adding modified magnetic powder with a mass ratio of magnetic powders to sulfuric acid of 100:24;

FIG. 8(*a*) illustrates modified magnetic powder; FIG. 8(*b*) illustrates magnetic powder separated after addition of a humic acid solution; and FIG. 8(*c*) illustrates magnetic powder after magnetic separation of the fermentation broth;

DESCRIPTION OF EMBODIMENTS

Figure 1:
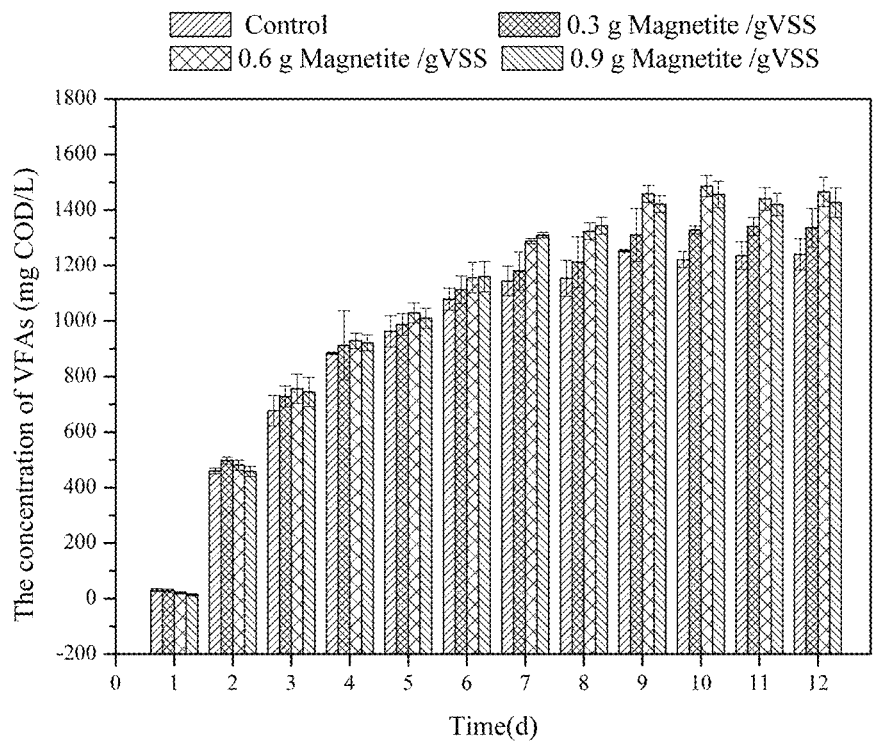
FIG. 1 illustrates the effect of addition of magnetite on acid production by alkaline fermentation of waste activated sludge.
Figure 2:
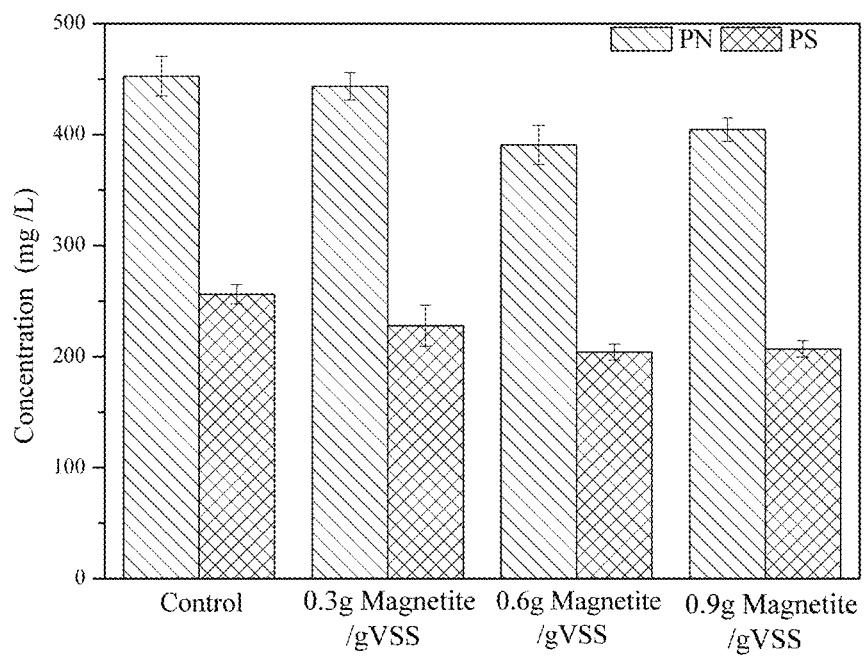
FIG. 2 illustrates the effect of addition of magnetite on degradation of polysaccharides (PS) and proteins (PN)
Figure 3:
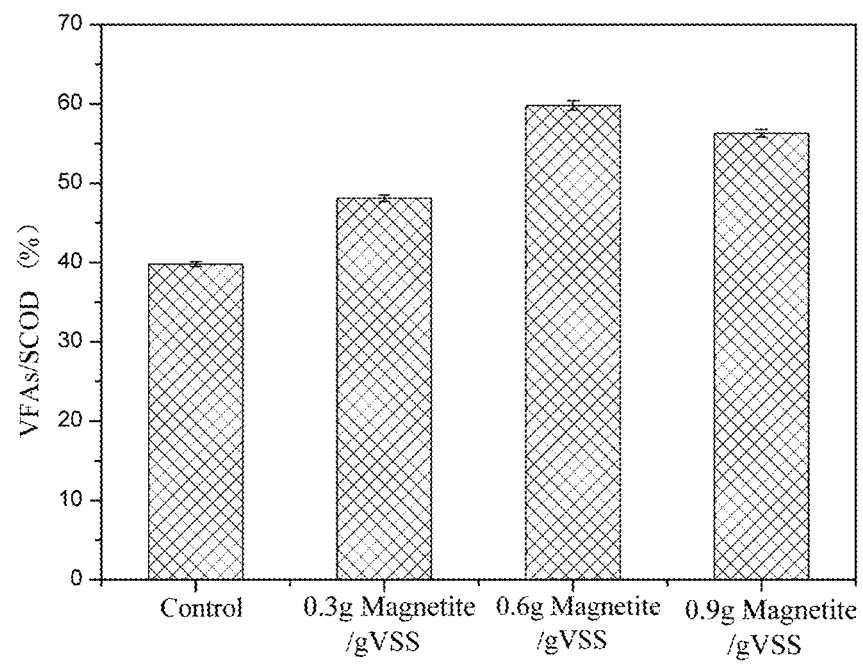
FIG. 3 illustrates the effect of addition of magnetite on the percentage of short chain fatty acids in soluble chemical oxygen demand (SCFAs/SCOD)
Figure 4:
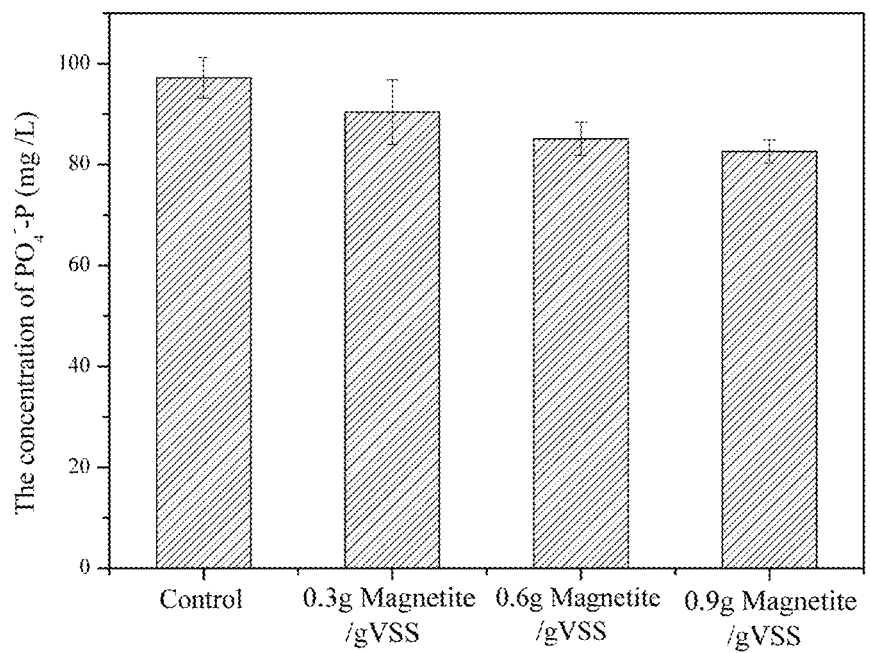
FIG. 4 illustrates the effect of addition of magnetite on orthophosphoric acid release from alkaline fermentation of waste activated sludge.

The present invention will be further illustrated and explained with reference to the attached drawings and specific embodiments.

According to the technical solution mentioned in the first aspect above, the unmodified magnetite is mixed with waste activated sludge for anaerobic fermentation of sludge to prove its specific technical effect. In order to compare the effect of adding magnetite, comparative example 1-1 without adding magnetite was set in the following experiment, and different amounts of magnetite were added in other examples 1-1, 1-2 and 1-3 respectively.

COMPARATIVE EXAMPLE 1-1

In this comparative example, the sludge anaerobic fermentation method with simultaneously enhanced acid production and phosphorus removal includes the following steps:

(1) 500 mL of concentrated sludge from an anaerobic-anoxic-aerobic ($A^2O$) process (the concentration of total suspended solids is 14910 mg/L, the concentration of volatile suspended solids was 6280 mg/L, pH=6.83) was added into a reactor, the pH of the sludge was adjusted to 10 with a sodium hydroxide solution of 2 mol/L, and nitrogen was introduced into the sludge for 5 min to remove air;

(2) the pH of the reactor was maintained at 10±0.1 using a sodium hydroxide solution of 2 mol/L.

10 days after fermentation, the acid yield of waste activated sludge reached 1221 mg (COD)/L. 12 days after fermentation, the concentrations of protein, polysaccharide, SCFAs/SOCD and orthophosphoric acid in the fermentation broth were 452.6 mg/L, 256.2 mg/L, 38.9% and 97.2 mg/L respectively.

EXAMPLES 1-1

In the embodiment, the sludge anaerobic fermentation method for simultaneous enhancement of acid production and phosphorus removal is as follows:

(1) 500 ml of waste activated sludge (the concentration of total suspended solids is 14910 mg/L, and the concentration of volatile suspended solids is 6280 mg/L, pH=6.83) from the concentrated anaerobic anoxic aerobic ($A^2O$) process were added into a reactor; the pH of the waste activated sludge was adjusted to 10 with a sodium hydroxide solution of 2 mol/L; magnetite was added into the waste activated sludge with an addition amount of 0.3 g/gVSS; nitrogen was introduced into the waste activated sludge for 5 minutes to remove air, and then anaerobic fermentation was conducted in a closed reactor under stirring condition; the fermentation temperature was 35° C., and the stirring speed of the reactor was 120 r/min;

2) a sodium hydroxide solution of 2 mol/L was used to maintain the pH of the reactor at 10±0.1.

10 days after fermentation, the maximum acid yield of the waste activated sludge was 1328.4 mg (COD)/L; 12 days after fermentation, the concentrations of protein, polysaccharide, SCFAs/SOCD and orthophosphate in the fermentation broth were 443.6 mg/l, 227.9 mg/l, 48.1% and 90.4 mg/l, respectively.

EXAMPLE 1-2

Compared with the sludge anaerobic fermentation method in Example 1-1, the difference in this embodiment was only that the addition amount of magnetite in waste activated sludge was 0.6 g/gVSS, and the rest was the same.

10 days after fermentation, the maximum acid yield of the xcess sludge reached 1486.0 mg (COD)/L.; 12 days after fermentation, the concentrations of protein, polysaccharide, SCFAs/SOCD and orthophosphoric acid were 390.7 mg/L, 204.2 mg/L, 59.8% and 85.1 mg/L, respectively.

EXAMPLE 1-3

Compared with the sludge anaerobic fermentation method in Example 1-1, the difference was only that the addition amount of magnetite in the waste activated sludge was 0.9 g/gVSS, and the rest was the same.

10 days after fermentation, the maximum acid yield of the waste activated sludge was 1455.8 mg (COD)/L; 12 days after fermentation, the concentrations of protein, polysaccharide, SCFAs/SOCD and orthophosphate in the fermentation broth were 404.6 mg/L, 207.0 mg/L, 56.3% and 82.6 mg/L, respectively.

The above-mentioned comparative example 1-1 and examples 1 to 3 were recorded as Control, 0.3 Magnetite/g VSS, 0.6 Magnetite/g VSS and 0.9 Magnetite/g VSS, respectively, and the specific results are shown in FIG. 1, FIG. 2, FIG. 3 and FIG. 4. Comparing the embodiment of the present invention with the comparative example, it can be seen that the acid yield, the degradation rate of protein and polysaccharide, and the ratio of short chain fatty acids to soluble chemical oxygen demand are obviously increased under alkaline conditions compared with those under simple alkaline conditions. In addition, adding magnetite under alkaline conditions can also generate more ferrous ions by promoting the reduction of dissimilated iron, ferrous ions can be combined with orthophosphate to form precipitates, and the precipitates and magnetite itself can further remove orthophosphate by adsorption, thus reducing the influence of the fermentation broth as a carbon source on biological phosphorus removal. Therefore, adding magnetite for fermentation under alkaline conditions can not only improve the efficiency of acid production, but also reduce the concentration of orthophosphate in the fermentation broth, which has a certain synergistic effect.

It should be pointed out that during the anaerobic fermentation of the sludge, the concentration of total suspended solids (TSS) and concentration of volatile suspended solids (VSS) of the waste activated sludge can be adjusted according to the actual sludge treatment, which generally does not affect the final treatment effect. Although the concentrations of total suspended solids (TSS) and volatile suspended solids (VSS) in waste activated sludge are defined as 10000-15000 mg/L/L and 6000-9000 mg/L in the above solution, the technical solution of the present invention can still be adopted beyond this range. Moreover, in the actual treatment process, the waste activated sludge just taken out from the secondary sedimentation tank of sewage treatment facilities is often low in concentration and too high in water content, so it is necessary to concentrate it by standing to improve the sludge concentration during fermentation treatment. In the present invention, the waste activated sludge just taken out from the secondary sedimentation tank can be left standing for 24-36 hours to stabilize and concentrate the sludge, the concentration of total suspended solids (TSS) and volatile suspended solids (VSS) of the concentrated residual sludge are 10000-30000 mg/L and 4000-18000 mg/L, and the concentrated waste activated sludge is added into an anaerobic reactor for anaerobic fermentation.

Therefore, according to the technical solution mentioned in the second aspect above, magnetite modified by sulfuric acid is mixed with concentrated waste activated sludge for anaerobic fermentation of the sludge to prove its specific technical effect.

In order to compare the effect of adding unmodified magnetite and sulfuric acid magnetite modified by sulfuric acid, Comparative Example 2-1 without adding magnetite, Examples 2-1, 2-2 and 2-3 with adding common unmodified magnetite powder (hereinafter referred to as unmodified magnetic powder), other Examples 2-4 to 2-12 with different addition amounts of magnetite powder modified by sulfuric acid (hereinafter referred to as modified magnetic powder) were set in the following experiments.

In the following examples, the specific preparation methods of unmodified magnetic powder and modified magnetic powder are described as follows:

Unmodified magnetic powder: magnetite powder with a particle size of 300-400 meshes were selected, in which content of $Fe_3O_4$ was 85%.

Modified magnetic powder: the unmodified magnetic powder was placed in a reaction kettle for stirring, and a sulfuric acid solution of 93% was continuously added into the reaction kettle by atomization, and the speed of adding the sulfuric acid solution into the reaction kettle was 5 L per hour. In the continuous stirring process, the magnetic powder and atomized sulfuric acid were fully contacted and reacted, and the sulfuric acid droplets were uniformly dispersed on the surface of magnetite powder, which made the surface of magnetite powder form a porous structure through the reaction. The total stirring time of sulfuric acid and magnetite was 5 h, and the stirring was stopped after the reaction, thus obtaining the modified magnetic powder. In the modification process, three groups of different mass ratios of sulfuric acid solution to magnetite were set in the subsequent examples of the invention. In the first group, the mass ratio of the sulfuric acid solution to magnetite added in the reactor was 6:100 (marked as modified magnetic powder A); in the second group, the mass ratio of the sulfuric acid solution to magnetite added in the reactor was 12:100 (marked as modified magnetic powder B); in the third group, the mass ratio of the sulfuric acid solution to magnetite in the reaction kettle was 24:100 (marked as modified magnetic powder C).

Figure 5:
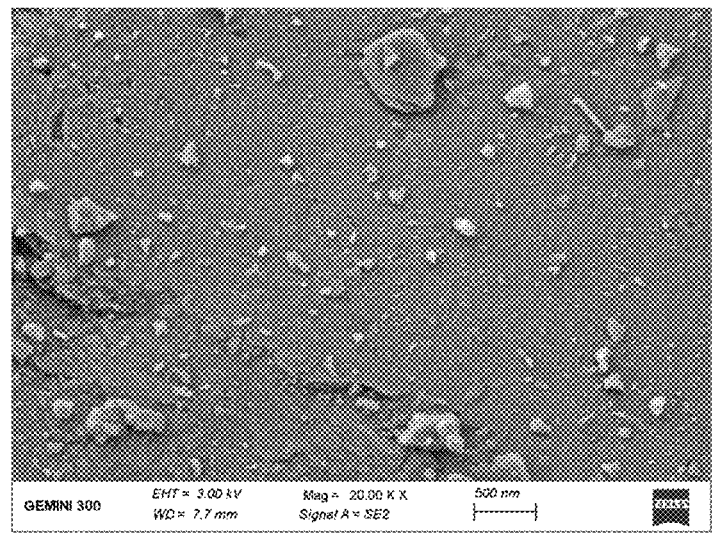
FIG. 5 illustrates the effect of acid modification on the surface structure of magnetic powder: (a) unmodified magnetic powder; (b) modified magnetic powder.
Figure 5:
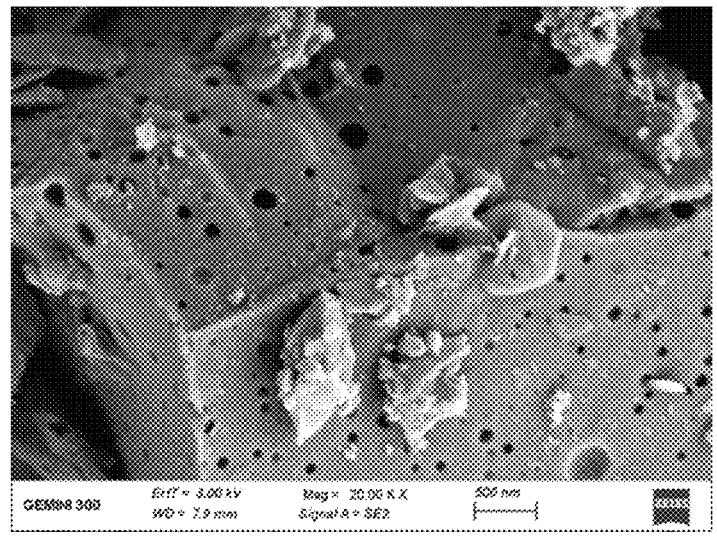
Figure 6A:
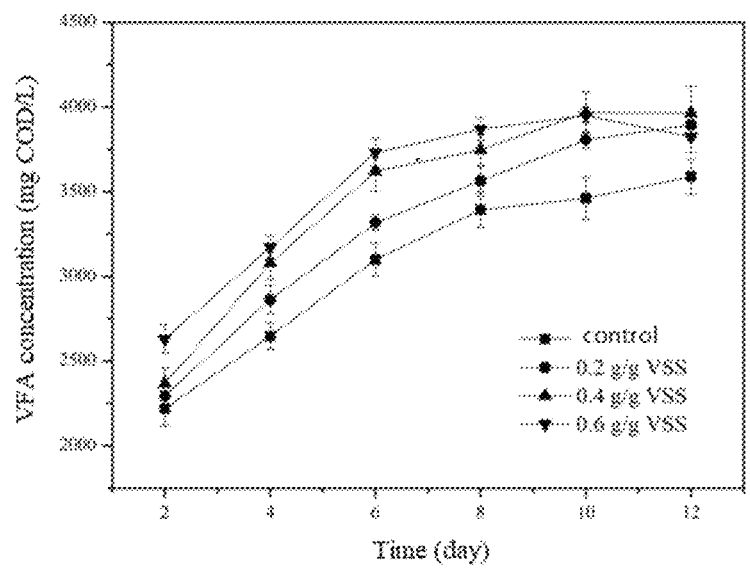
FIGS. 6(a)-6(d) illustrate the effect of addition of magnetic powder on acid production of alkaline fermentation of waste activated sludge.
Figure 6B:
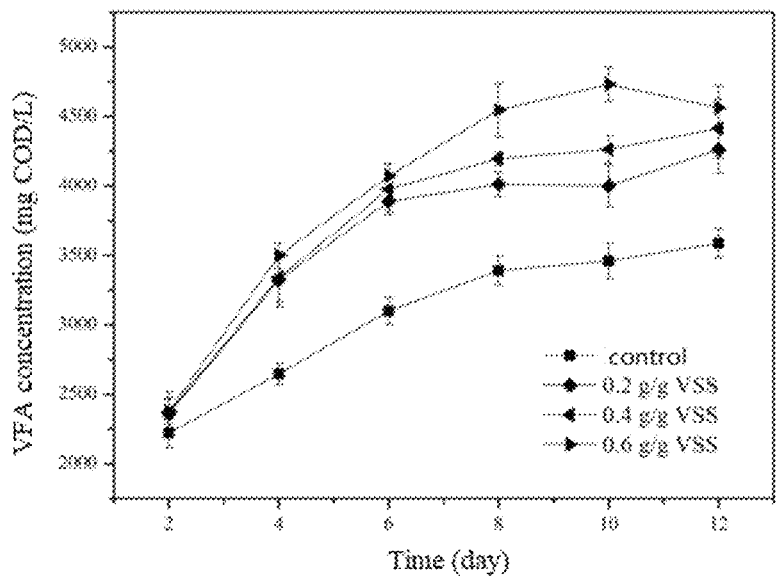
Figure 6C:
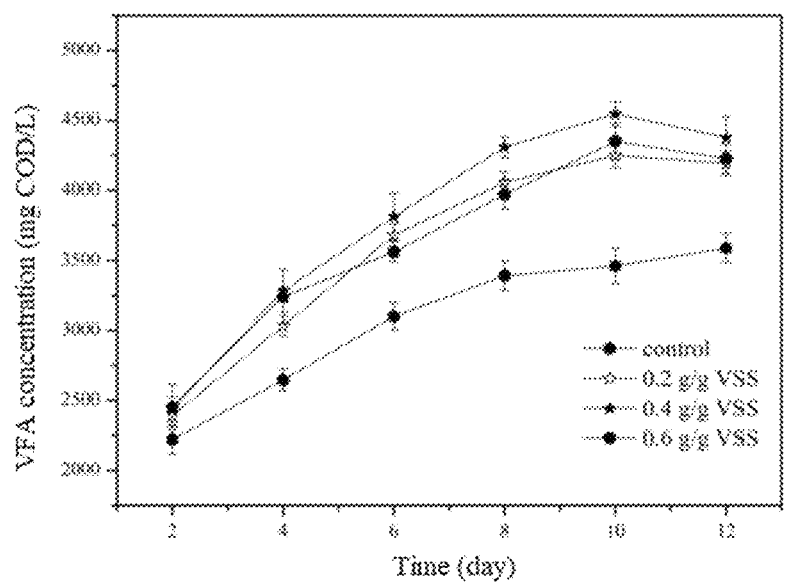
Figure 6D:
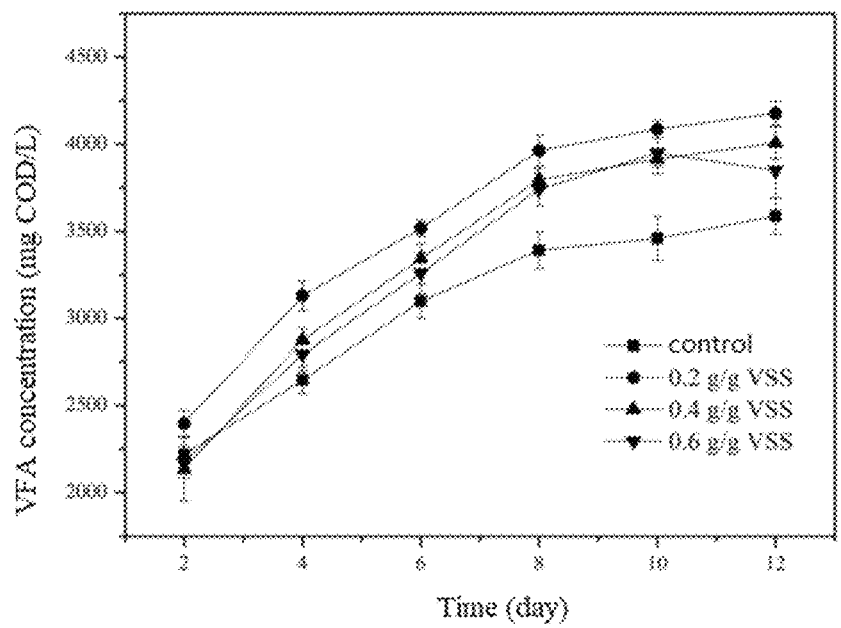
Figure 7:
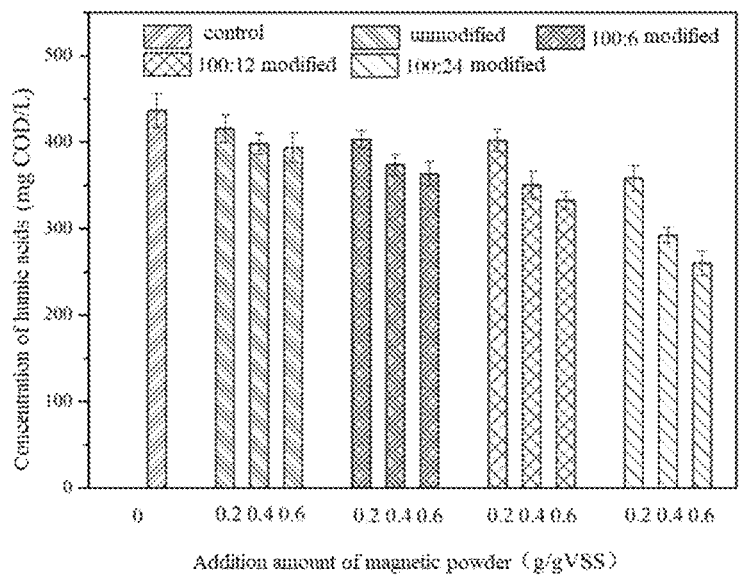
FIG. 7 illustrates the effect of addition of modified magnetic powder on humic acid content in the alkaline fermentation broth of waste activated sludge.
Figure 8A:
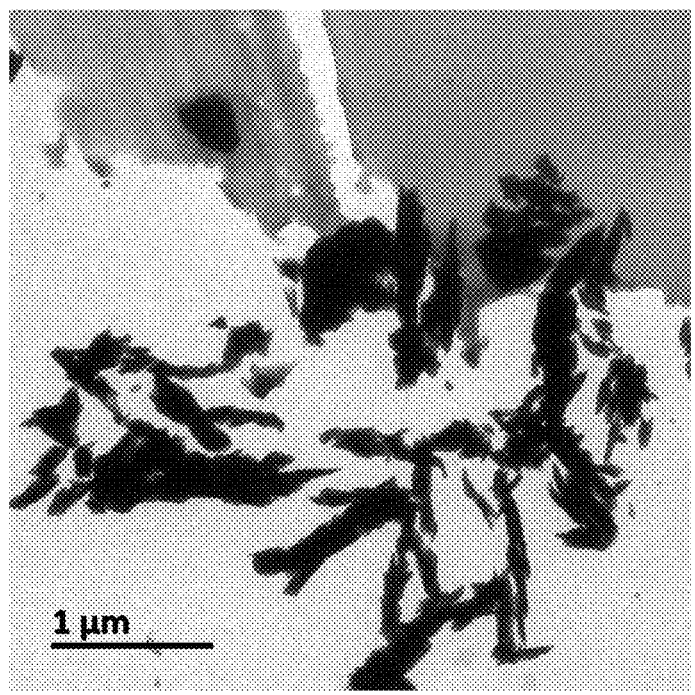
FIGS. 8(*a*)-8(*c*) illustrate the TEM characterization of humic acid adsorbed by modified magnetic powder.
Figure 8B:
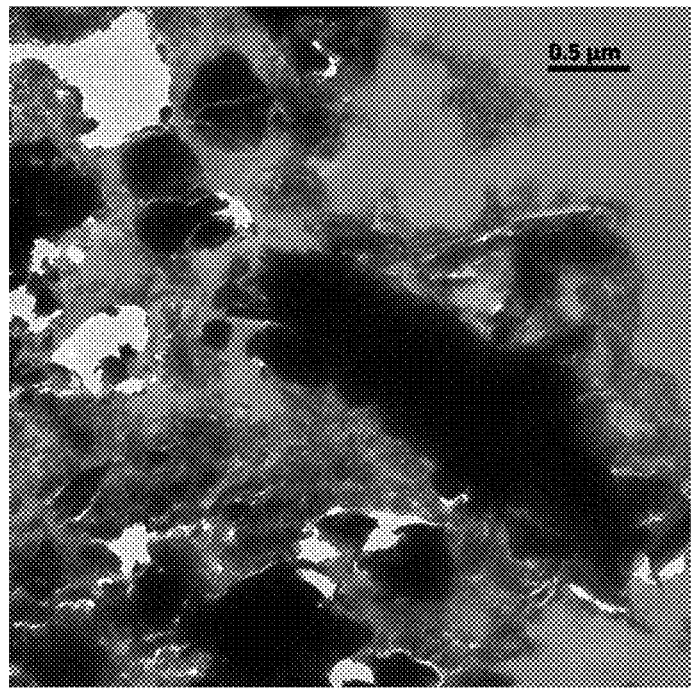
Figure 8C:
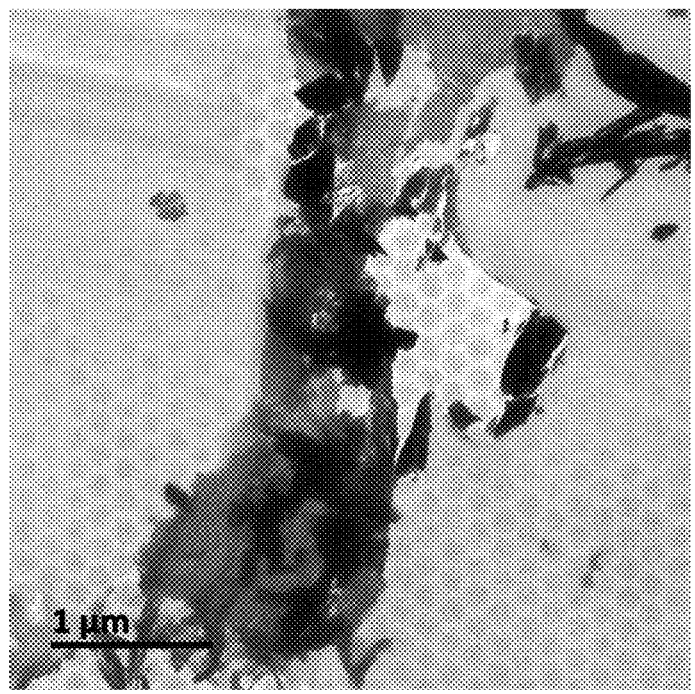
Figure 9:
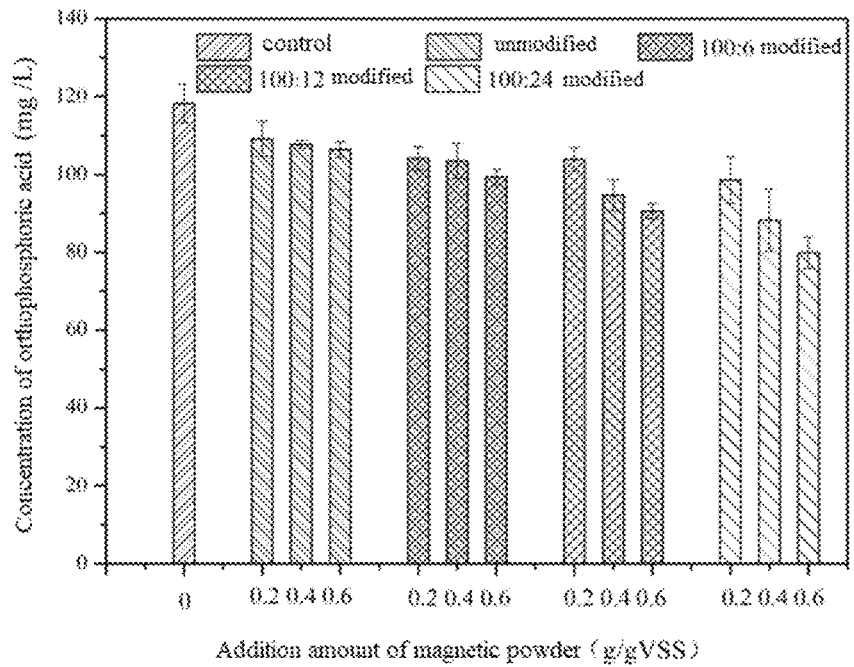
FIG. 9 illustrates the effect of addition of modified magnetic powder on content of the orthophosphate in a sludge alkaline fermentation broth.
Figure 10:
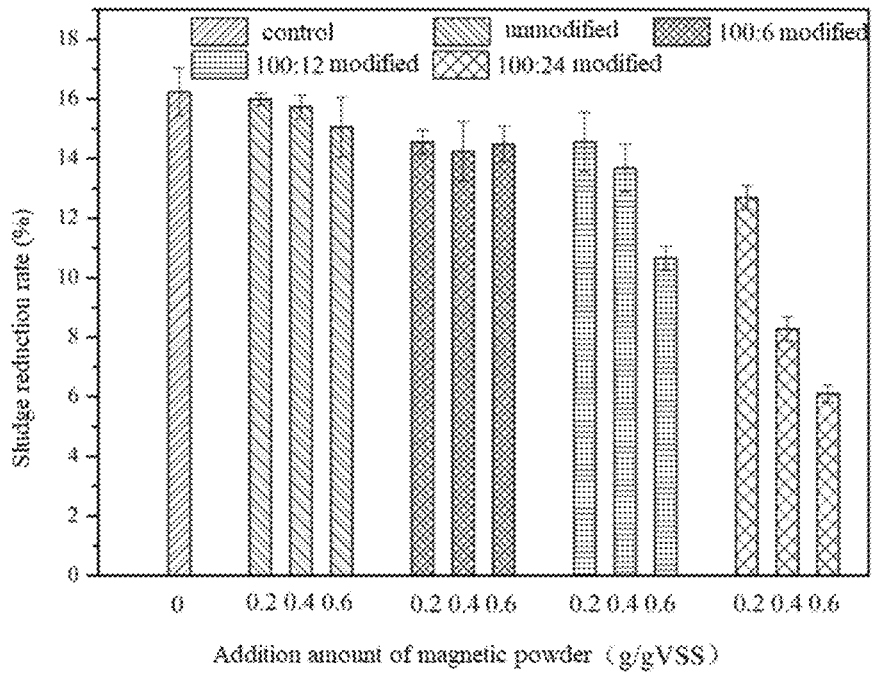
FIG. 10 illustrates the change of waste activated sludge reduction effect after addition of modified magnetic powders.

SEM photographs of the unmodified magnetic powder are shown in FIG. 5(a), and SEM photographs of the modified magnetic powder are shown in FIG. 5(b). It can be seen from the comparison in the figure that the complete surface structure of the modified magnetic powder was destroyed, and a porous structure was formed, which was easier to interact with organisms, thus achieving better strengthening effect. At the same time, a small amount of ferric sulfate and ferrous sulfate were generated after acid modification of the modified magnetic powder, and iron hydroxide substances generated under alkaline conditions would adhere to the surface of the magnetic powder, which could adsorb the refractory organic by-products (mainly humic acid) and phosphorus in the fermentation broth (as shown in FIGS. 8(a)-8(c)).

COMPARATIVE EXAMPLE 2-1

In this comparative example, the sludge anaerobic fermentation method includes the following steps: (1) 500 mL of concentrated waste activated sludge (TSS=27320 mg/L, VSS=11660 mg/L, pH=6.86) was added into a reactor, the pH value of the waste activated sludge was adjusted to 10 with a sodium hydroxide solution of 2 mol/L, nitrogen was introduced into the reactor for 5 min to remove air, and fermentation was conducted in a closed reactor at 35° C. with a stirring speed of 120 r/min. The fermentation time was 12 days, and a sodium hydroxide solution of 2 mol/L was used in the fermentation process to maintain the pH value of the system at 10±0.1.

In this experiment, after 10 days of fermentation, the acid yield tended to be stable, and the stable acid yield was 3461.0 mgCOD/L, the concentration of humic acid was 436.5 mg/L, the concentration of orthophosphate was 118.3 mg/mL, and the sludge reduction rate was 16.2%. See FIG. 6(a), FIG. 7, FIG. 9, and FIG. 10 for details, and this comparative example served as the control group in each figure.

EXAMPLE 2-1

In this embodiment, the sludge anaerobic fermentation treatment method with simultaneously enhanced acid production and phosphorus removal while reducing the concentration of unfavorable by-products includes the following steps:

500 mL of concentrated waste activated sludge (TSS=27320 mg/L, VSS=11660 mg/L, pH=6.86) were added into the reactor, the pH value of the waste activated sludge was adjusted to 10 with a sodium hydroxide solution of 2 mol/L, and then unmodified magnetic powder was added into the waste activated sludge in the anaerobic reactor, with the addition amount of unmodified magnetic powder being 0.2 g/gVSS. Nitrogen was introduced into the reactor for 5 minutes to remove air, fermentation was conducted in a closed reactor at 35° C. with stirring speed of 120 r/min for 12 days, and a sodium hydroxide solution of 2 mol/L was used in the fermentation process to maintain the pH value of the reactor at 10±0.1. After fermentation, the unmodified magnetic powder was separated by a magnetic field.

In this experiment, after 10 days of fermentation, the acid yield tended to be stable, and the stable acid yield was 3806.0 mgCOD/L, the concentration of humic acid was 415.7 mg/L, the content of orthophosphate was 109.1 mg/mL, and the sludge reduction rate was 16.0%. See FIG. 6(a), FIG. 7, FIG. 9 and FIG. 10 for details.

EXAMPLE 2-2

Compared with the sludge anaerobic fermentation method in Example 2-1, the difference in this example was that the addition amount of unmodified magnetic powder in waste activated sludge was 0.4 g/gVSS, and the rest was the same.

In this experiment, after 10 days of fermentation, the acid yield tended to be stable, and the stable acid yield was 3967.2 mgCOD/L, the concentration of humic acid was 398.2 mg/L, the concentration of orthophosphate was 107.8 mg/mL, and the sludge reduction rate was 15.7%. See FIG. 6(a), FIG. 7, FIG. 9 and FIG. 10 for details.

EXAMPLE 2-3

Compared with the sludge anaerobic fermentation method in Example 2-1, the difference in this example was that the addition amount of unmodified magnetic powder in waste activated sludge was 0.6 g/gVSS, and the rest was the same.

In this experiment, after 10 days of fermentation, the acid yield tended to be stable, and the stable acid yield was 3949.1 mgCOD/L, the concentration of humic acid was 393.6 mg/L, the concentration of orthophosphate was 106.4 mg/mL, and the sludge reduction rate was 15.1%. See FIG. 6(a), FIG. 7, FIG. 9 and FIG. 10 for details.

EXAMPLE 2-4

In this embodiment, the sludge anaerobic fermentation treatment method with simultaneously enhanced acid production and phosphorus removal and a reduced concentration of unfavorable by-products includes the following steps:

500 mL of concentrated waste activated sludge (TSS=27320 mg/L, VSS=11660 mg/L, pH=6.86) were added into the reactor, the pH value of the waste activated sludge was adjusted to 10 with a sodium hydroxide solution of 2 mol/L and then modified magnetic powder A (the mass ratio of magnetic powder to sulfuric acid is 100:6) was added into the waste activated sludge in the anaerobic reactor. Nitrogen was introduced into the reactor for 5 minutes to remove air, fermentation was conducted in a closed reactor at 35° C. with stirring speed of 120 r/min for 12 days, and a sodium hydroxide solution of 2 mol/L was used in the fermentation process to maintain the pH value of the reactor at 10±0.1. Modified magnetic powder A was separated using a magnetic field after fermentation.

In this experiment, after 10 days of fermentation, the acid yield tended to be stable, and the stable acid yield was 4000.3 mgCOD/L, the concentration of humic acid was 403.4 mg/L, the concentration of orthophosphate was 104.1 mg/mL, and the sludge reduction rate was 14.6%. See FIG. 6(b), FIG. 7, FIG. 9 and FIG. 10 for details.

EXAMPLE 2-5

Compared with the sludge anaerobic fermentation method in Example 2-4, the difference in this example was that the addition amount of modified magnetic powder A in waste activated sludge was 0.4 g/gVSS, and the rest was the same.

In this experiment, after 10 days of fermentation, the acid yield tended to be stable, and the stable acid yield was 4263.6 mgCOD/L, the concentration of humic acid was 373.9 mg/L, the concentration of orthophosphate was 103.5 mg/mL, and the sludge reduction rate was 14.2%. See FIG. 6(b), FIG. 7, FIG. 9 and FIG. 10 for details.

EXAMPLE 2-6

In this embodiment, the sludge anaerobic fermentation treatment method with simultaneously enhanced acid production and phosphorus removal and a reduced concentration of unfavorable by-products comprises the following steps:

Compared with the sludge anaerobic fermentation method in Example 2-4, the difference in this example was that the addition amount of modified magnetic powder A in waste activated sludge was 0.6 g/gVSS, and the rest was the same.

In this experiment, after 10 days of fermentation, the acid yield tended to be stable, and the stable acid yield was 4732.1 mgCOD/L, the concentration of humic acid was 363.6 mg/L, the concentration of orthophosphate was 99.4 mg/mL, and the sludge reduction rate was 14.5%. See FIG. 6(b), FIG. 7, FIG. 9 and FIG. 10 for details.

EXAMPLE 2-7

In this embodiment, the sludge anaerobic fermentation treatment method with simultaneously enhanced acid production and phosphorus removal and a reduced concentration of unfavorable by-products comprises the following steps:

500 mL of concentrated waste activated sludge (TSS=27320 mg/L, VSS=11660 mg/L, pH=6.86) were added into the reactor, the pH value of the waste activated sludge was adjusted to 10 with a sodium hydroxide solution of 2 mol/L, and then modified magnetic powder B (he mass ratio of the magnetic powder to sulfuric acid was 100:12) were added to the waste activated sludge in the anaerobic reactor. Nitrogen was introduced into the reactor for 5 minutes to remove air, fermentation was conducted in a closed reactor at 35° C. with a stirring speed of 120 r/min for 12 days, and a sodium hydroxide solution of 2 mol/L was used in the fermentation process to maintain the pH value of the reactor at 10±0.1. The modified magnetic powder B was separated by using a magnetic field after fermentation.

In this experiment, after 10 days of fermentation, the acid yield tended to be stable, and the stable acid yield was 4249.0 mgCOD/L, the concentration of humic acid was 402.2 mg/L, the concentration of orthophosphate was 103.9 mg/mL, and the sludge reduction rate was 14.6%. See FIG. 6(c), FIG. 7, FIG. 9 and FIG. 10 for details.

EXAMPLE 2-8

Compared with the sludge anaerobic fermentation method in Example 2-7, the difference in this example was that the addition amount of modified magnetic powder B in waste activated sludge was 0.4 g/gVSS, and the rest was the same.

In this experiment, after 10 days of fermentation, the acid yield tended to be stable, and the stable acid yield was 4546.0 mgCOD/L, the concentration of humic acid was 350.6 mg/L, the concentration of orthophosphate was 94.7 mg/mL, and the sludge reduction rate was 13.7%. See FIG. 6(c), FIG. 7, FIG. 9 and FIG. 10 for details.

EXAMPLE 2-9

Compared with the sludge anaerobic fermentation method in Example 2-7, the difference in this example was that the addition amount of modified magnetic powder B in waste activated sludge is 0.6 g/gVSS, and the rest was the same.

In this experiment, after 10 days of fermentation, the acid yield tended to be stable, and the stable acid yield was 4350.2 mgCOD/L, the concentration of humic acid was 332.5 mg/L, the concentration of orthophosphate was 90.6 mg/mL, and the sludge reduction rate was 10.7%. See FIG. 6(c), FIG. 7, FIG. 9 and FIG. 10 for details.

EXAMPLE 2-10

In this embodiment, the sludge anaerobic fermentation treatment method with simultaneously enhanced acid production and phosphorus removal and a reduced concentration of unfavorable by-products comprises the following steps:

500 mL of concentrated waste activated sludge (TSS=27320 mg/L, VSS=11660 mg/L, pH=6.86) were added into the reactor, the pH value of the waste activated sludge was adjusted to 10 with a sodium hydroxide solution of 2 mol/L, and then modified magnetic powder C (the mass ratio of magnetic powder to sulfuric acid was 100:24) was added to the waste activated sludge in the anaerobic reactor. Nitrogen was introduced into the reactor for 5 minutes to remove air, fermentation was conducted in a closed reactor at 35° C. with stirring speed of 120 r/min for 12 days, and a sodium hydroxide solution of 2 mol/L was used in the fermentation process to maintain the pH value of the reactor at 10±0.1. The modified magnetic powder C was separated by using a magnetic field after fermentation.

In this experiment, after 10 days of fermentation, the acid yield tended to be stable, and the stable acid yield was 4087.5 mgCOD/L, the concentration of humic acid was 358.6 mg/L, the concentration of orthophosphate was 98.6 mg/mL, and the sludge reduction rate was 12.7%. See FIG. 6(d), FIG. 7, FIG. 9 and FIG. 10 for details.

EXAMPLE 2-11

Compared with the sludge anaerobic fermentation method in Example 2-10, the only difference in this example was that the addition amount of modified magnetic powder C in waste activated sludge was 0.4 g/gVSS, and the rest was the same.

In this experiment, after 10 days of fermentation, the acid yield tended to be stable, and the stable acid yield was 3915.6 mgCOD/L, the concentration of humic acid was 292.5 mg/L, the concentration of orthophosphate was 88.3 mg/mL, and the sludge reduction rate was 8.3%. See FIG. 6(d), FIG. 7, FIG. 9 and FIG. 10 for details.

EXAMPLE 2-12

Compared with the sludge anaerobic fermentation method in Examples 2-10, the difference in this example was that the addition amount of modified magnetic powder C in waste activated sludge was 0.6 g/gVSS, and the rest was the same.

In this experiment, after 10 days of fermentation, the acid yield tended to be stable, and the stable acid yield was 3950.5 mgCOD/L, the concentration of humic acid was 260.1 mg/L, the concentration of orthophosphate was 79.9 mg/mL, and the sludge reduction rate was 6.1%. See FIG. 6(d), FIG. 7, FIG. 9 and FIG. 10 for details.

Compared with the above examples and comparative examples, it can be seen that adding magnetic powder and modified magnetic powder under alkaline conditions can obviously increase the acid production of sludge by alkaline fermentation, especially modified magnetic powder; in addition, modified magnetic powder can greatly reduce the content of humic acid and orthophosphate in the sludge fermentation broth. The more acid added during magnetic powder modification and the more magnetic powder added during fermentation reaction can achieve better results. FIGS. 8(a)-8(c) show that the main reason for reducing humic acid in a fermentation broth is the adsorption of modified magnetic powder, and the removal of orthophosphate is mainly the adsorption and chemical precipitation of modified magnetic powder. However, when the best humic acid and orthophosphate removal effect is achieved, the sludge reduction effect will obviously deteriorate, because the metal salt in the modified magnetic powder cannot be separated from the sludge by a magnetic field, resulting in an increase in sludge quantity. Therefore, it is necessary to determine the acid addition ratio during magnetic powder modification and the addition ratio of modified magnetic powder during fermentation according to the actual situation.

The above embodiments are only preferred solutions of the present invention, but they are not intended to limit the present invention. Those of ordinary skill in the relevant technical field can make various changes and modifications without departing from the spirit and scope of the present invention. For example, an automatic control device can be set in the reactor to regulate the pH of the waste activated sludge. Therefore, all technical solutions obtained by equivalent substitution or equivalent transformation shall fall within the protection scope of the present invention.

What is claimed is:

1. A sludge anaerobic fermentation treatment method with simultaneously enhanced acid production and phosphorus removal, comprising the following steps:
    (1) adding waste activated sludge into an anaerobic reaction system, wherein a concentration of a total suspended solid TSS of the waste activated sludge is 10000-15000 mg/L, and a concentration of a volatile suspended solid VSS of the waste activated sludge is 6000-9000 mg/L; and
    (2) adjusting a pH value of the waste activated sludge to 10±0.1 with a sodium hydroxide solution; adding magnetite into the waste activated sludge with an addition amount of 0.3-0.9 g/gVSS; removing air in a reactor, then sealing the reactor, and performing anaerobic fermentation for 10-15 days under stirring, while always maintaining the pH value of the waste activated sludge at 10±0.1 during the stirring and the fermentation,
    wherein the magnetite is subjected to acid treatment prior to being mixed with the sludge, and a method for the acid treatment comprises:
    placing and continuously stirring powdery magnetite in a reaction kettle while continuously adding a sulfuric acid solution of 93%-98% into the reaction kettle by atomization to form a porous structure on the surface of magnetite powders through reaction of the atomized sulfuric acid with a magnetite powder, wherein a mass ratio of the sulfuric acid solution to the magnetite added in the reaction kettle is 6-24:100.

2. The sludge anaerobic fermentation treatment method with simultaneously enhanced acid production and phosphorus removal according to claim 1, wherein the waste activated sludge is waste activated sludge in an anaerobic-anoxic-aerobic ($A^2O$) process.

3. The sludge anaerobic fermentation treatment method with simultaneously enhanced acid production and phosphorus removal according to claim 1, wherein a molar concentration of the sodium hydroxide solution is 2 mol/L.

4. The sludge anaerobic fermentation treatment method with simultaneously enhanced acid production and phosphorus removal according to claim 1, wherein a method for removing air in the reactor comprises introducing nitrogen into the waste activated sludge in the reactor for 5-15 minutes.

5. The sludge anaerobic fermentation treatment method with simultaneously enhanced acid production and phosphorus removal according to claim 1, wherein a rotating speed of the stirring and the fermentation is 60-120 r/min, and a fermentation temperature is 30-35° C.

6. The sludge anaerobic fermentation treatment method with simultaneously enhanced acid production and phosphorus removal according to claim 1, wherein a pH electrode is arranged in the reactor for monitoring the pH value of the waste activated sludge in real time.

7. The sludge anaerobic fermentation treatment method with simultaneously enhanced acid production and phosphorus removal according to claim 1, wherein the powdery magnetite contains not less than 75% of $Fe_3O_4$ with a particle size of 300-400 meshes.

8. The sludge anaerobic fermentation treatment method with simultaneously enhanced acid production and phosphorus removal according to claim 1, wherein the waste activated sludge is subjected to static concentration treatment prior to being added into the anaerobic reaction system.

9. The sludge anaerobic fermentation treatment method with simultaneously enhanced acid production and phosphorus removal according to claim 1, wherein, in the reaction kettle, the sulfuric acid solution is added at a speed of 4-6 L/100 kg magnetite powder per hour, and a time for continuous stirring reaction of the magnetite in the reaction kettle is 3-5h.

10. The sludge anaerobic fermentation treatment method with simultaneously enhanced acid production and phosphorus removal according to claim 8, wherein, in the waste activated sludge after the static concentration treatment, the concentration of the total suspended solid TSS is 25000-30000 mg/L, and the concentration of the volatile suspended solid VSS is 11000-18000 mg/L.

11. A sludge anaerobic fermentation treatment method with simultaneously enhanced acid production and phosphorus removal and a reduced concentration of adverse by-products, comprising the following steps:
  (1) allowing waste activated sludge to stand for 24-36h to stabilize and concentrate the sludge, wherein the concentrated waste activated sludge has a concentration of a total suspended solid TSS of 10000-30000 mg/L and a concentration of a volatile suspended solid VSS of 4000-18000 mg/L; adding the concentrated waste activated sludge into an anaerobic reactor; and
  (2) adjusting a pH value of the concentrated waste activated sludge to 10±0.1 with a sodium hydroxide solution, and then adding a modified magnetic powder into the waste activated sludge in the anaerobic reactor, wherein an addition amount of the modified magnetic powder is 0.2-0.6 g/gVSS; introducing nitrogen into the reactor for 5-15 minutes to remove air in the reactor, sealing the reactor, and performing fermentation under stirring at a rotating speed of 60-120 r/min at a fermentation temperature of 30-35° C. for a stirring time of 10-15 days, while always maintaining the pH value of sludge at 10±0.1 during the stirring and the fermentation; and after the reaction is finished, separating the modified magnetic powder from the sludge by using a magnet,
  wherein the modified magnetic powder is prepared by a method comprising: placing and continuously stirring powdery magnetite in a reaction kettle while continuously adding a sulfuric acid solution of 93%-98% into the reaction kettle by atomization to form a porous structure on a surface of magnetite powder through reaction of the atomized sulfuric acid with magnetite powder, thus obtaining a modified magnetic powder, wherein the sulfuric acid solution is added into the reaction kettle at a speed of 5 L/100 kg magnetite powder per hour, a mass ratio of the sulfuric acid solution to the magnetite added in the reaction kettle is 6-24:100, and a total time of stirring and reaction of the sulfuric acid and the magnetite is 5h.

12. The sludge anaerobic fermentation treatment method with simultaneously enhanced acid production and phosphorus removal and a reduced concentration of adverse by-products according to claim 11, wherein, in the step (2), the addition amount of the modified magnetic powder is 0.2 g/gVSS, 0.4 g/gVSS, or 0.6 g/gVSS.

13. The sludge anaerobic fermentation treatment method with simultaneously enhanced acid production and phosphorus removal and a reduced concentration of adverse by-products according to claim 11, wherein, during preparation of the modified magnetic powder, the mass ratio of the sulfuric acid solution to the magnetite added in the reaction kettle is 6:100, 12:100, or 24:100.

14. The sludge anaerobic fermentation treatment method with simultaneously enhanced acid production and phosphorus removal and a reduced concentration of adverse by-products according to claim 11, further comprising: increasing the addition amount of the modified magnetic powder and/or increasing the mass ratio of the sulfuric acid solution to the magnetite during the preparation of the modified magnetic powder, so as to improve removal efficiency of phosphorus and humic acid from sludge anaerobic fermentation products.

15. The sludge anaerobic fermentation treatment method with simultaneously enhanced acid production and phosphorus removal and a reduced concentration of adverse by-products according to claim 11, further comprising: reducing the addition amount of the modified magnetic powder and/or reducing the mass ratio of the sulfuric acid solution to the magnetite during the preparation of the modified magnetic powder, in case where a sludge amount reduction effect in the sludge anaerobic fermentation needs to be guaranteed first.

16. The sludge anaerobic fermentation treatment method with simultaneously enhanced acid production and phosphorus removal and a reduced concentration of adverse by-products according to claim 11, wherein, in the step (2), the addition amount of the modified magnetic powder is 0.4 g/gVSS; and during the preparation of the modified magnetic powder, the mass ratio of the sulfuric acid solution to the magnetite added in the reaction kettle is 12:100.

17. The sludge anaerobic fermentation treatment method with simultaneously enhanced acid production and phosphorus removal and a reduced concentration of adverse by-products according to claim 11, wherein, in the step (2), the addition amount of the modified magnetic powder is 0.6 g/gVSS; and during the preparation of the modified magnetic powder, the mass ratio of the sulfuric acid solution to the magnetite added in the reaction kettle is 24:100.

* * * * *